United States Patent
Bonas et al.

(10) Patent No.: US 10,073,839 B2
(45) Date of Patent: Sep. 11, 2018

(54) ELECTRONICALLY BASED THESAURUS QUERYING DOCUMENTS WHILE LEVERAGING CONTEXT SENSITIVITY

(71) Applicant: International Business Machines Corporation, Armonk, NY (US)

(72) Inventors: Rachel M. Bonas, Irving, TX (US);
Edwin J. Bruce, Corinth, TX (US);
Benjamin J. Flora, Coppell, TX (US);
Romelia H. Flores, Keller, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 935 days.

(21) Appl. No.: 13/930,660

(22) Filed: Jun. 28, 2013

(65) Prior Publication Data
US 2015/0006149 A1    Jan. 1, 2015

(51) Int. Cl.
*G10L 21/00* (2013.01)
*G06F 17/27* (2006.01)
(Continued)

(52) U.S. Cl.
CPC .... *G06F 17/2795* (2013.01); *G06F 17/30737* (2013.01); *G06Q 50/01* (2013.01);
(Continued)

(58) Field of Classification Search
CPC ........... G06F 17/30669; G06F 17/3064; G06F 17/2264; G06F 17/2785; G06F 17/30864; G10L 21/0208
(Continued)

(56) References Cited

U.S. PATENT DOCUMENTS 7,610,382 B1 *  10/2009  Siegel ................. G06F 17/2264
                                                         704/10
8,392,441 B1 *  3/2013   Papachristou ...... G06F 17/3064
                                                         707/759
(Continued)

OTHER PUBLICATIONS

Inkpen, D., "Near-Synonym Choice in an Intelligent Thesaurus," In Proc. of Human Language Technology Conf. of the North American Chapter of the Assoc. of Computational Linguistics (HLT-NAACL '07), pp. 356-363, 2007.

*Primary Examiner* — Farzad Kazeminezhad
(74) *Attorney, Agent, or Firm* — Cuenot, Forsythe & Kim, LLC

(57) ABSTRACT

Arrangements described herein relate to language enhancement. Source text can be automatically gathered from a plurality of text sources, the plurality of text sources including at least one social media website, and storing the source text to a thesaurus data infrastructure. Subject text being exposed to thesaurus processing can be received, a context of the subject text can be identified, and the thesaurus data infrastructure can be accessed while the thesaurus queries previously acquired source texts or documents having similar context to identify source text having context similar to the context of the subject text. The identified source text can be analyzed to identify at least one candidate word or phrase contained in the source text to recommend as a replacement for at least one word or phrase contained in the subject text. The identified at least one candidate word or phrase can be recommended as the replacement for the at least one word or phrase contained in the subject text.

15 Claims, 5 Drawing Sheets

(51) Int. Cl.
*G06F 17/30* (2006.01)
*G06Q 50/00* (2012.01)
*G10L 21/0208* (2013.01)

(52) U.S. Cl.
CPC .... *G06F 17/2785* (2013.01); *G06F 17/30864* (2013.01); *G10L 21/0208* (2013.01)

(58) Field of Classification Search
USPC .......................................................... 704/9
See application file for complete search history.

(56) References Cited

U.S. PATENT DOCUMENTS

2009/0125497 A1* 5/2009 Jiang ................ G06F 17/30669
2010/0286979 A1 11/2010 Zangvil et al.
2011/0270603 A1 11/2011 Ovil et al.

* cited by examiner

ELECTRONICALLY BASED THESAURUS QUERYING DOCUMENTS WHILE LEVERAGING CONTEXT SENSITIVITY

BACKGROUND

Arrangements described herein relate to computing resources for language enhancement and, more particularly, to electronically based thesauruses.

To interact with other people, one must use some form of language. Words play an essential role in practically every activity. Because of this, the ability to communicate well is critical. Sometimes in the process of writing a document, the writer experiences "writer's block," and the writer may have difficulty finding the most appropriate words or phrases to articulate what is to be said. In addition, use of the same words time after time again in the same document results in boredom for the reader. Conversely, the use of different wordings while making similar statements in various places will make both writing and spoken conversations more interesting to those on the receiving ends. Describing something from many angles rather than just one always helps paint a clearer picture around expressed ideas. Audiences therefore benefit from better overall understanding when something repeated comes via different forms of expression. A Thesaurus can be a useful tool for anyone who needs to communicate with other people, and provides support to individuals who wish to leverage the use of synonyms in their writing.

BRIEF SUMMARY

One or more embodiments disclosed within this specification relate to language enhancement.

A method of language enhancement can include automatically gathering source text from a plurality of text sources, the plurality of text sources including at least one social media website, and storing the source text to a thesaurus data infrastructure. The method also can include receiving subject text being exposed to thesaurus processing, identifying a context of the subject text, and accessing the thesaurus data infrastructure to identify source text having context similar to the context of the subject text. The method further can include analyzing, using a processor, the identified source text to identify at least one candidate word or phrase contained in the source text to recommend as a replacement for at least one word or phrase contained in the subject text. The identified at least one candidate word or phrase can be recommended as the replacement for the at least one word or phrase contained in the subject text.

A system can include a processor programmed to initiate executable operations. The executable operations can include automatically gathering source text from a plurality of text sources, the plurality of text sources including at least one social media website, and storing the source text to a thesaurus data infrastructure. The executable operations also can include receiving subject text being exposed to thesaurus processing, identifying a context of the subject text, and accessing the thesaurus data infrastructure to identify source text having context similar to the context of the subject text. The executable operations further can include analyzing, using a processor, the identified source text to identify at least one candidate word or phrase contained in the source text to recommend as a replacement for at least one word or phrase contained in the subject text. The identified at least one candidate word or phrase can be recommended as the replacement for the at least one word or phrase contained in the subject text.

A computer program product for enhancing language includes a computer readable storage medium having program code stored thereon. The program code is executable by a processor to perform a method. The method can include automatically gathering source text from a plurality of text sources, the plurality of text sources including at least one social media website, and storing the source text to a thesaurus data infrastructure. The method also can include receiving subject text being exposed to thesaurus processing, identifying a context of the subject text, and accessing the thesaurus data infrastructure to identify source text having context similar to the context of the subject text. The method further can include analyzing, using a processor, the identified source text to identify at least one candidate word or phrase contained in the source text to recommend as a replacement for at least one word or phrase contained in the subject text. The identified at least one candidate word or phrase can be recommended as the replacement for the at least one word or phrase contained in the subject text.

DETAILED DESCRIPTION

Figure 1:
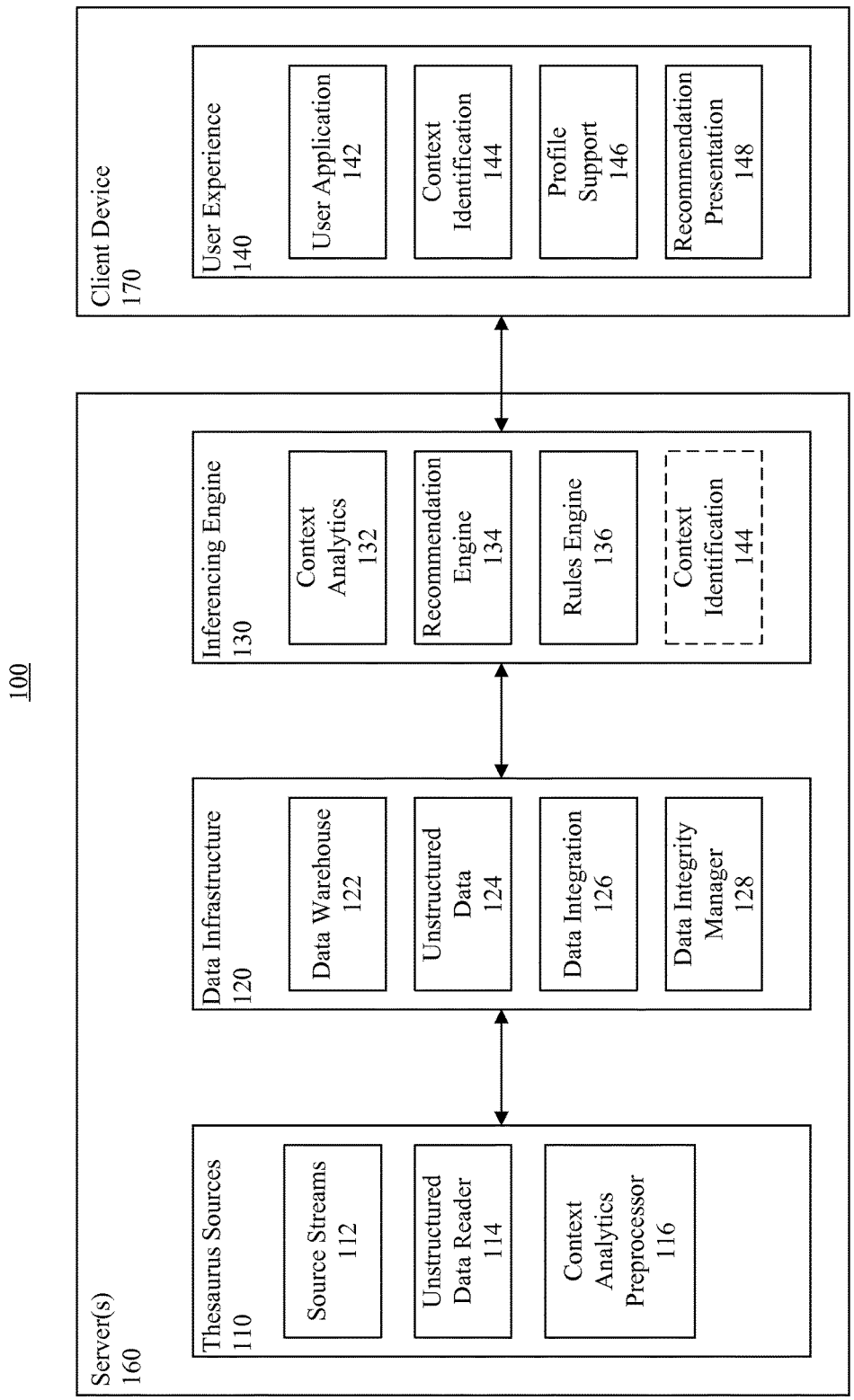
FIG. 1 is a block diagram illustrating a system for language enhancement in accordance with an embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. As defined herein, the term "computer-readable storage medium" means a tangible storage medium that contains or stores program code for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to computing resources for language enhancement and, more particularly, to electronically based thesauruses. Text can be automatically gathered from a plurality of text sources and stored to a thesaurus data infrastructure. The plurality of text sources can include dictionaries, encyclopedias, other thesauruses, books, social media websites, and the like. When subject text being exposed to thesaurus processing is received, for example text contained in a natural language document, the subject text can be analyzed to identify the context of the text. The thesaurus data infrastructure can be accessed to identify source text, such as natural language text, having context similar to the context of the subject text. The identified source text can be analyzed to identify at least one candidate word or phrase contained in the source text to recommend as a replacement for at least one word or phrase contained in the subject text. In addition, source data from one or more dictionaries or other thesaurus' also can be analyzed to identify the candidate words and/or phrases.

The gathering of text from one or more of the text sources can be an enduring process. For example, web crawling can be performed on text sources available via the Internet, such as social media websites. When new source text is identified, the new source text can be added to the thesaurus data infrastructure, thus continually training the electronic based thesaurus and expanding the thesaurus' knowledge base. Thus, as use of words or phrases in language changes over time, the thesaurus will automatically adapt, keeping abreast of current context about organizations, currently popular slang and other trending information. Moreover, rules can be dynamically created that not only identify the use of such words or phrases in the source text, but also categorize such words or phrases into various categories, such as formal language, natural language, slang, etc. based on the context of the source text. Accordingly, the thesaurus can be configured to recommend appropriate words or phrases for use in subject text based on the context of the subject text.

FIG. 1 is a block diagram illustrating a system 100 for language enhancement using an electronic thesaurus (hereinafter "thesaurus") in accordance with one embodiment disclosed within this specification. The system 100 can include various components executable and/or maintained by one or more processing systems to perform thesaurus operations and functions described herein. Such components can include, for example, thesaurus sources 110, data infrastructure 120, an inferencing engine 130 and user experience components 140. Together, these components can constitute the thesaurus.

In one arrangement, the inferencing engine 130, data infrastructure 120 and thesaurus sources 110 can be executed and/or maintained on one or more servers 160 and the user experience components 140 can be executed and/or maintained on a client device 170. In another arrangement, one or more of the user experience components 140, the inferencing engine 130, the data infrastructure 120 and the thesaurus sources 110 can be executed and/or maintained on the server(s) 160, and the client device 170 can access the user experience components 140 via a suitable client application, for example using a web browser or the like.

The server(s) 160 each can include a processor, memory, a computer-readable storage medium, a network adapter and other suitable components that enable the server to perform server side processes and functions described herein. Various types of suitable servers are well known in the art. The client device 170 can include a processor, memory, a computer-readable storage medium, a network adapter, a display and other suitable components that enable the client device to perform client side processes and functions described herein. Examples of a client device 170 include, but are not limited to, a computer (e.g., a workstation, a desktop computer, a mobile computer, a laptop computer, a tablet computer, a user wearable computer, etc.), a smart phone, a personal digital assistant, a network appliance, a gaming system, or the like.

The server 160 and client device 170 each can be communicatively linked to one or more suitable networks via the network adapters. The network(s) can be implemented as, or include, any of a variety of different networks such as a WAN, a LAN, a wireless network, a mobile network, a Virtual Private Network (VPN), the Internet, the Public Switched Telephone Network (PSTN), or the like. Via the network(s) the server 160 and client device 170 can communicate with one another and communicate with other resources accessible via the network(s).

The thesaurus sources 110 can facilitate intake of reference and supporting information to drive the thesaurus' decision processes. For example, the thesaurus sources 110 can include a source stream 112, an unstructured data reader 114 and a context analytics preprocessor 116.

The source streams 112 can gather input from bulk data streams and feeds deemed relevant to thesaurus knowledge and processing. Examples of such bulk data streams and feeds include, but are not limited to, dictionary data, encyclopedia data, data from other thesauruses, data from books, data from social media websites, and the like. The gathered data can include both structured data and unstructured data. The structured data can include text, as well as any other data relevant to the text. The unstructured data can include natural language text. As noted, the gathering of text from one or more of the data sources can be an enduring process, for example using a web crawling process. As used herein, the term "web crawling" means to browse the World Wide Web in a methodical, automated manner in an orderly fashion. In illustration, text available from social media websites typically is constantly updated as users create new posts on the web sites. Similarly, community based online dictionaries and encyclopedias may be constantly updated as users update such resources with new and/or revised text. The use of web crawling enables such updates to be captured by the system 100 each time the web crawling process again accesses such websites. Traditional dictionaries and encyclopedias may only be revised periodically. Thus, data from traditional dictionaries and encyclopedias need only be updated when new versions of such dictionaries and encyclopedias are released. Similarly, data from books need only be updated when new versions of the books are released, if ever.

The unstructured data reader 114 can be configured understand natural language from unstructured information gathered via the source streams 112. The context analytics preprocessor 116 can perform initial contextual analytics on new natural language source text to identify the context of such text when the source text is acquired in the source streams 112 and generate corresponding contextual information. The contextual information can facilitate identification of the intended meaning of words and/or phrases contained in the source text. The contextual information may, for example, include relevant constraints of the communicative situation that influence language use in the text, language variation, discourse summary, or other contextual information related to the source text. Further, the context analytics preprocessor 116 can generate other structured data from the natural language text based on the analysis performed. For example, the context analytics preprocessor 116 can generate corresponding metadata including word counts, quality ratings and other measures.

The data infrastructure 120 can store and maintain data acquired into the system 100 by the thesaurus sources 110, as well as data generated by the thesaurus sources 110. The data infrastructure 120 can include a data warehouse 122, unstructured data 124, a data integration module 126 and a data integrity manager 128.

The data warehouse 122 can store structured data gained by the unstructured data reader 114 reading in text and preprocessing being performed by the context analytics preprocessor 116. Such structured data can include, but is not limited to, the contextual information metadata generated by the context analytics preprocessor 116. The unstructured data 124 stored in the data infrastructure 120 can include unstructured text received via the source streams 112. For example, the unstructured text can be contained in natural language documents received in the source streams 112.

The data integration module 126 can monitor and control acquisition and updating of the unstructured data 124 and data stored in the data warehouse 122. In other words, as more source data is read into the data infrastructure 120 on a regular basis, the data integration module 126 can constantly update the data infrastructure 120 accordingly.

The data integrity manager 128 can ensure data quality. In illustration, the data integrity manager 128 can remove redundant data and supersede older data with new data when such new data becomes available. For example, when a post in a social networking site is updated, the data integrity manager 128 can replace text from the original post with text from the updated post. Further, the data integrity manager 128 can disregard or remove from the data infrastructure 120 source text that does not satisfy one or more rules and/or requirements. For example, the data integrity manager 128 can perform grammar analysis on source text and disregard or remove from the data infrastructure 120 source text not meeting a minimum grammar level.

Prior to discussing the inferencing engine 130, it is appropriate to first discuss the user experience components 140. The user experience components 140 can include a user application 142, a context identification module 144, a profile support module 146 and a recommendation presentation module 148.

The user application 142 can be any application that supports text editing. Examples of the user application 142 include, but are not limited to, a word processor, a presentation program, an illustration program, an e-mail client, an instant messaging client, a social networking client, a web browser, and the like. In this regard, the user experience 140 can support thesaurus functions for a variety of different mediums. In one arrangement, thesaurus functionality can be provided to the user application 142 via a suitable plugin or module. In another arrangement, the user application 142 can access a helper application (not shown), executed on the client device 170 or the server 160, to enable use of the thesaurus described herein with the other application(s).

The context identification module 144 can be configured to identify at least a portion of text including words and/or phrases to be exposed to thesaurus processing, and thus referred to as "subject text," and process that portion of the text to identify the context of the text and generate corresponding contextual information. In illustration, if the subject text is contained in a natural language document, the context identification module 144 can analyze a portion of the document (e.g., a paragraph, a page, a section, a chapter, or the like) or the entire document to identify the context of the subject text. The contextual information can facilitate identification of the intended meaning of words and/or phrases contained in the subject text. The contextual information may, for example, include relevant constraints of the communicative situation that influence language use in the text, language variation, discourse summary, or other contextual information related to the subject text.

In one aspect, the portion of the subject text can be selected by a user via a suitable user input. Moreover, the user also can select one or more words and/or phrases in the subject text for which the user desires the thesaurus to recommend candidate words and/phrases (e.g., synonyms) that may be used to replace (e.g., substitute) the identified words and/or phrases. In another aspect, the inferencing engine 130 can identify one or more words and/or phrases in the subject text for which candidate replacement words and/or phrases may be recommended. In an alternative arrangement, rather than being a component of the user experience components 140, the context identification module 144 can be a component of the inferencing engine 130.

The profile support module 146 can maintain a user profile for each of one or more users. A user profile may contain information related to a respective user, such as preferred output formats, confidence level thresholds, and expected grade levels for returned vocabulary. Such information can be entered and/or changed by the user when desired. The confidence level thresholds can be threshold values indicating acceptable values of confidence that candidate words and/or phrases are acceptable replacements for words and/or phrases contained in text. The threshold values can be numerical values, percentiles, or any other suitable values. The expected grade levels can indicate a level of writing sophistication desired for the text when candidate words and/or phrases are used to replace words and/or phrases in the text. Algorithms that rank writing sophistication in terms of grade level are known in the art.

The recommendation presentation module 148 can receive from the inferencing engine 130 recommendations of one or more candidate words and/or phrases that may be used to replace each identified word and/or phrase in the text exposed the thesaurus processing. Such recommendations can be based, at least in part, on the user profile (e.g., the threshold values, expected grade levels, etc.). By way of example, for a particular word or phrase, the inferencing engine 130 can identify a plurality of words or phrases that are potential synonyms, and communicate the plurality of words or phrases to the recommendation presentation module 148 as candidate words or phrases. The recommendation presentation module 148 can present to the user the candidate words or phrases in a view presented on a display of the client device 170, or presented audibly to the user via speakers of the client device 170. In this regard, the recommendation engine 134 can generate the recommendations, and the recommendation presentation module 148 can present the recommendations to a user. Thus, the recommendation engine 134 can be considered to be the component that recommends the identified candidate words as the replacement words and/or phrases contained in the subject text.

The inferencing engine 130 can include context analytics 132, a recommendation engine 134 and a rules engine 136. The context analytics 132 can identify and evaluate the context of the subject text identified by the context identification module 144, which will be described. For example, the context identification module 144 can expose the context of the subject text to the context analytics 132 for analysis.

Such analysis can be used by the recommendation engine 134 to search for suitable candidate words or phrases contained in the data infrastructure 120, for example data stored in the data warehouse 122 and/or the unstructured data 124, to identify source text having context similar to the context of the subject text. The inferencing engine 130 can analyze the identified source text to identify one or more candidate words and/or phrases contained in the source text to recommend as replacements for one or more words and/or phrases contained in the subject text. For example, the inferencing engine 130 can perform natural language inferential processing on the source text which, as noted, may be stored as natural language documents. In this regard, the recommendation engine 134 can leverage the data infrastructure 120 to discover candidate words and/or phrases based on the currently identified context of the subject text.

The recommendation engine 134 also can associate confidence values with the candidate words and/or phrases to indicate the level of confidence such words and/or phrases are suitable substitutions to replace corresponding words and/or phrases in the subject text. The recommendation engine 134 need only return those words and/or phrases with confidence levels meeting user profile preferences, and the returned words and/or phrases can be recommended as candidates to replace words and/or phrases in the subject text. Further, based on the confidence levels, the recommendation engine 134 can assign a ranking to each of the candidate words or phrases. Each ranking assigned to a respective candidate word or phrase can indicate a level of confidence that the respective candidate word and/or phrase is an appropriate replacement for the word and/or phrase contained in the subject text.

The rules engine 136 can dynamically create rules to assist the context analytics 132 pertaining to the processing of the subject text. Specifically, these rules can be processed by the recommendation engine 134 to identify the source text accessed from the data infrastructure 120 having context similar to the context of the subject text. Such source text can be accessed by the recommendation engine 134 to identify candidate words and/or phrases contained in the source text. In this regard, the rules generated by the rules engine 136 can be created by performing initial processing on source text when the source text is gathered via the source streams 112 and stored in the data infrastructure 120.

Figure 2:
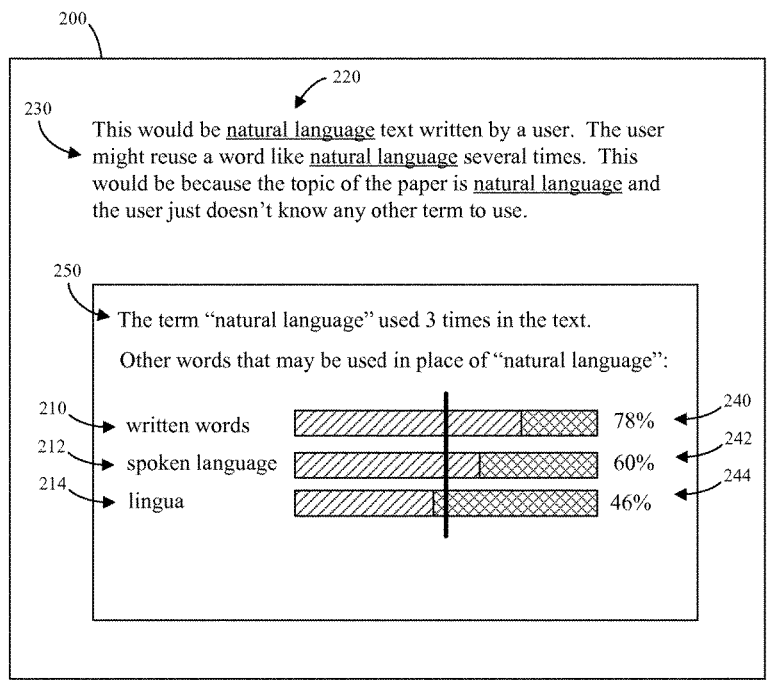
FIG. 2 depicts an example of a view presented to a user recommending language enhancement using an electronic thesaurus in accordance with an embodiment disclosed within this specification.

FIG. 2 depicts an example of a view 200 presented to a user on the display of the client device 170 recommending a plurality of candidate words 210, 212, 214. From the candidate words 210, 212, 214, the user may select a candidate word to replace one or more instances of a word 220 contained in natural language text 230 exposed to thesaurus processing and analyzed by the inferencing engine 130. For instance, if the inferencing engine 130 identifies the candidate words 210, 212, 214 as potential replacements for the word "natural language" 220, the recommendation presentation module 148 can present the subject text 230 and within the subject text 230 underline, highlight or otherwise indicate the words 220 which may be replaced with a candidate word 210, 212, 214. Further, for each of the candidate words 210, 212, 214, the recommendation presentation module 148 can present a respective confidence level 240, 242, 244 indicating the confidence, determined by the inferencing engine 130, that each respective candidate word 210, 212, 214 is a suitable replacement for the word 220 in the text 230. In this regard, the confidence levels 240, 242, 244 can be regarded as rankings assigned to each of the candidate words 210, 212, 214. The confidence levels 240, 242, 244 can be based, at least in part, on the grade level indicated in the user profile, and usage of the respective candidate words 210, 212, 214 in a variety of the thesaurus resources 110, as will be described.

The user can select a first instance of the word 220 and select one of the candidate words 210, 212, 214 to replace that instance, select a second instance of the word 220 and select one of the candidate words 210, 212, 214 to replace that instance, and so on. In this regard, the recommendation presentation module 148 module can provide in the view 200 an indication 250 indicating the number of times the word 220 is used in the text 230. To achieve a more sophisticated level of writing, the user may choose to replace different instances of the word 220 with different ones of the candidate words 210, 212, 214.

In one arrangement, the candidate words 210, 212, 214 selected by the user can automatically replace the subject words. In another arrangement, the user can copy and paste the desired candidate words 210, 212, 214 into the document. After each selection is made to replace a particular instance of the word 220, the recommendation presentation module 148 can update the candidate words 210, 212, 214 recommended for other instances of the word 220. For example, if the user selects the candidate word 210 to replace the first instance of the word 220, that candidate word 210 optionally can be removed from the list of candidate words 210, 212, 214 recommended as possible replacements for the second instance of the word 220. Further, the list can be updated after the use selects a candidate word 210, 212, 214 to replace the second instance of the word 220, and so on. In one aspect, the recommendation presentation module 148 can communicate to the recommendation engine 134 each candidate word selection, and the recommendation engine 134 can update the list of recommended candidate words 210, 212, 214 and/or confidence levels 240, 242, 244. In another aspect, the recommendation presentation module 148 module can perform local processing to update the list of recommended candidate words 210, 212, 214, for example by removing from the list candidate words 210, 212, 214 that already have been selected, rearranging the list, etc.

The foregoing example describes identification of candidate words 210, 212, 214 to replace a subject word in the natural language text. Nonetheless, the same processes described can be applied to identifying candidate phrases to replace a phrase in natural language text, and presenting corresponding rankings assigned to each of the candidate phrases.

Figure 3:
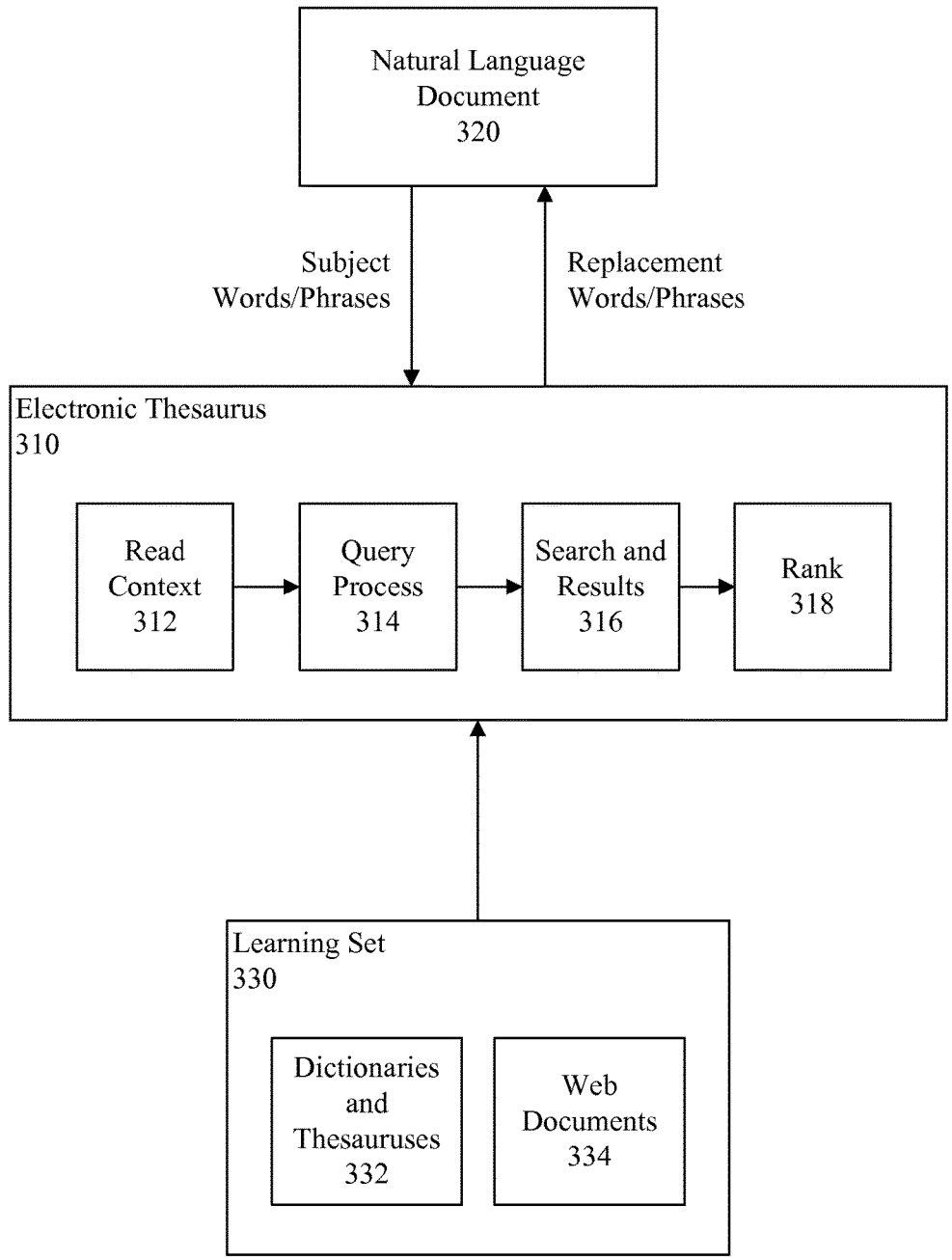
FIG. 3 is a process flow diagram illustrating a process of language enhancement using an electronic thesaurus in accordance with an embodiment disclosed within this specification.

FIG. 3 is a process flow diagram 300 illustrating a process of language enhancement using an electronic thesaurus (hereinafter "thesaurus") 310 in accordance with an embodiment disclosed within this specification. The thesaurus 310 can be implemented using the components previously described in FIG. 1. In one arrangement, the thesaurus 310 can be provided as a cloud service and/or application to users.

A natural language document (hereinafter "document") 320, or a portion of the document 320, can be exposed to (e.g., received by) the thesaurus 310 in order for the thesaurus to identify candidate words and/or phrases that may be used to replace subject words and/or phrases in the document 320, thus enhancing the language contained therein. The natural language document 320 can be a word processor document, a plain text document, a presentation document, an illustration document, a resume, an e-mail, a text message, an instant message, a post on a website, or the like.

At step 312, the thesaurus 310 can identify the context of the subject text contained in the document 320. As noted, the context of the subject text can provide information about the intended meaning of words and/or phrases contained in the document 320.

At step 314, the thesaurus 310 can query previously acquired source documents having similar context and usage of text as the document 320. Examples of the source documents include, but are not limited to dictionaries and other thesauruses 332, as well as web documents 334. The source documents can be contained in the data infrastructure 120 of FIG. 1. Together, the source documents 332, 334 can form a learning set 330 used by the thesaurus 310 to make appropriate recommendations of candidate words and/or phrases to replace subject words and/or phrases contained in the document 320. As noted, web crawling can be performed to keep the web documents 334 current.

At step 316, the learning set 330 can be analyzed to identify candidate words and/or phrases to replace subject words or phrases contained in the document 320, and corresponding search results can be generated. At step 318, each viable candidate word and/or phrase can be assigned a respective confidence level indicating the confidence that the candidate word and/or phrase is a suitable replace for a subject word and/or phrase identified in the document 320. The candidate words and/or phrases can be ranked based upon their respective confidence levels, and recommended to a user as replacements for words and/or phrases contained in the document 320.

The aforementioned processes can be implemented in real time, either as a user types or as candidate words are selected. As used herein, the term "real time" means a level of processing responsiveness that a user or system senses as sufficiently immediate for a particular process or determination to be made, or that enables the processor to keep up with some external process.

Figure 4:
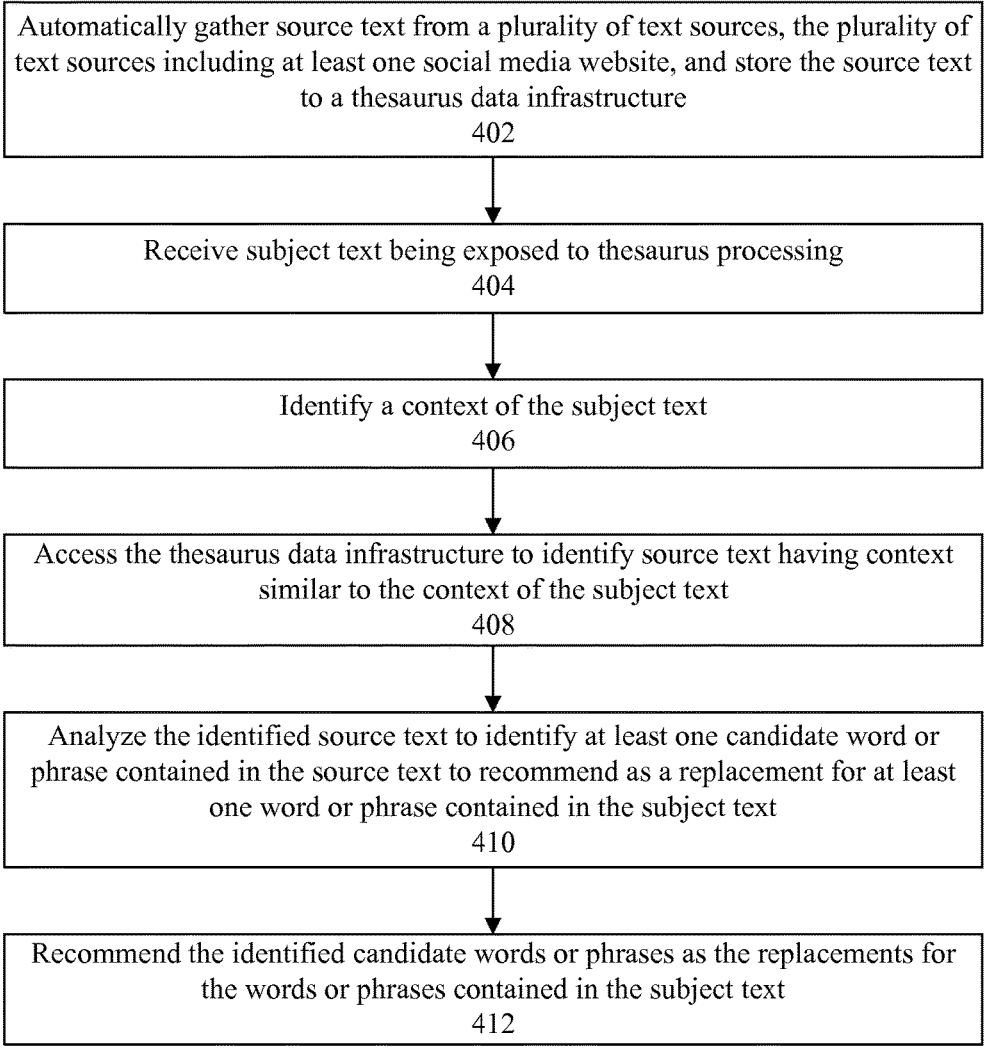
FIG. 4 is a flow chart illustrating a method of language enhancement using an electronic thesaurus in accordance with an embodiment disclosed within this specification.

FIG. 4 is a flow chart illustrating a method 400 of language enhancement using an electronic thesaurus in accordance with an embodiment disclosed within this specification. At step 402, source text can be automatically gathered from a plurality of text sources. The plurality of text sources can include at least one social media website. The source text can be stored to a thesaurus data infrastructure.

At step 404, subject text being exposed to thesaurus processing can be received. The subject text can be a portion of a document, or an entire document. As noted, the document can be a word processor document, a plain text document, a presentation document, an illustration document, a resume, an e-mail, a text message, an instant message, a post on a website, or the like. At step 406, the context of the subject text can be identified.

At step 408, the thesaurus data infrastructure can be accessed to identify source text having context similar to the context of the subject text. At step 410, the source text can be analyzed to identify at least one candidate word or phrase contained in the source text to recommend as a replacement for at least one word or phrase contained in the subject text. At step 412, the identified candidate words or phrases can be recommended as the replacements for the words or phrases contained in the subject text. In one arrangement, a ranking can be assigned to each of the candidate words or phrases. Each ranking assigned to a respective candidate word or phrase can indicate a level of confidence that the respective candidate word or phrase is an appropriate replacement for the word or phrase contained in the subject text.

Figure 5:
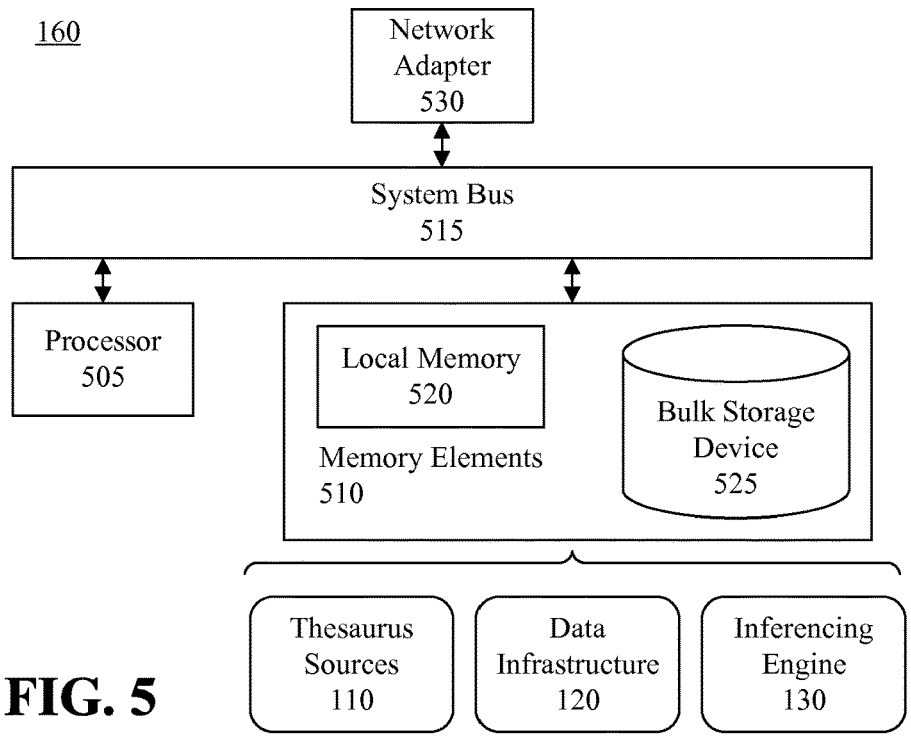
FIG. 5 is a block diagram of a server in accordance with an embodiment disclosed within this specification.

FIG. 5 is a block diagram of the server 160 of FIG. 1 in accordance with an embodiment disclosed within this specification. The server 160 can include at least one processor 505 (e.g., a central processing unit) coupled to memory elements 510 through a system bus 515 or other suitable circuitry. As such, the server 160 can store program code within the memory elements 510. The processor 505 can execute the program code accessed from the memory elements 510 via the system bus 515. It should be appreciated that the server 160 can be implemented in the form of any system including a processor and memory that is capable of performing the functions and/or operations described within this specification.

The memory elements 510 can include one or more physical memory devices such as, for example, local memory 520 and one or more bulk storage devices 525. Local memory 520 refers to RAM or other non-persistent memory device(s) generally used during actual execution of the program code. The bulk storage device(s) 525 can be implemented as a hard disk drive (HDD), solid state drive (SSD), or other persistent data storage device. The server 160 also can include one or more cache memories (not shown) that provide temporary storage of at least some program code in order to reduce the number of times program code must be retrieved from the bulk storage device 525 during execution.

One or more network adapters 530 can be coupled to server 160 to enable server 160 to become coupled to other systems, computer systems, remote printers, and/or remote storage devices through intervening private or public networks. Modems, cable modems, transceivers, and Ethernet cards are examples of different types of network adapters 530 that can be used with server 160.

As pictured in FIG. 5, the memory elements 510 can store the components of the server 160, namely the thesaurus sources 110, the data infrastructure 120 and the inferencing engine 130. Being implemented in the form of executable program code, these components of the system 100 can be executed by the server 160 and, as such, can be considered part of the server 160. Moreover, the thesaurus sources 110, the data infrastructure 120 and the inferencing engine 130 are functional data structures that impart functionality when employed as part of the server 160 of FIG. 5.

Figure 6:
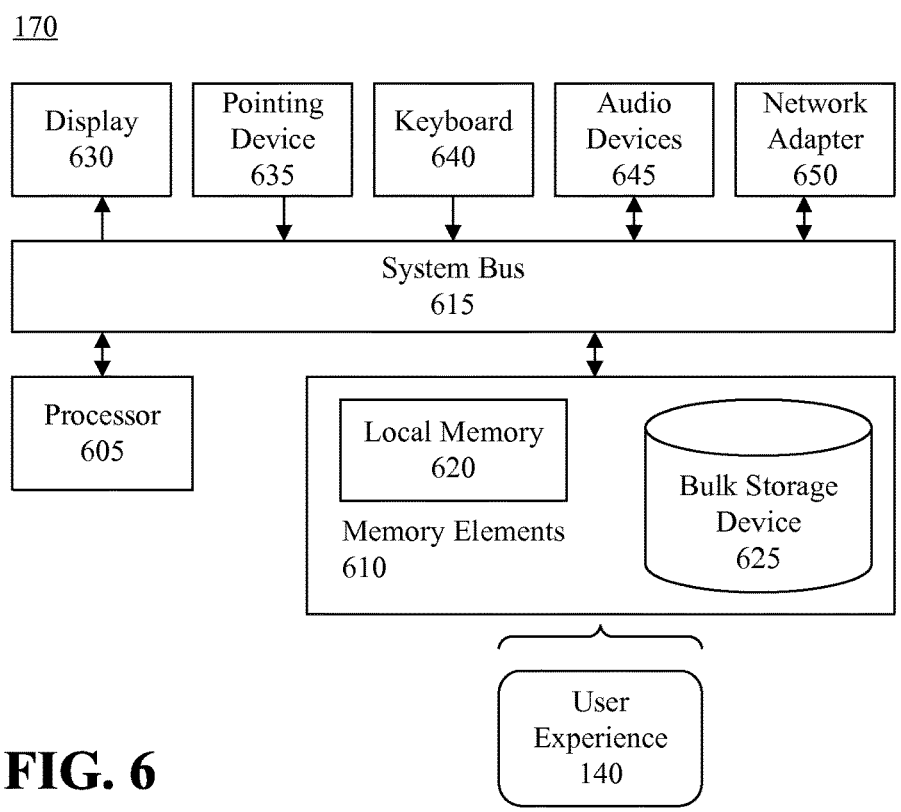
FIG. 6 is a block diagram of a client device in accordance with another embodiment disclosed within this specification.

FIG. 6 is a block diagram of the client device 170 of FIG. 1 in accordance with an embodiment disclosed within this specification. The client device 170 can include at least one processor 605 (e.g., a central processing unit) coupled to memory elements 610 through a system bus 615 or other suitable circuitry. As such, the client device 170 can store program code within the memory elements 610. The processor 605 can execute the program code accessed from the memory elements 610 via the system bus 615. It should be appreciated that the client device 170 can be implemented in the form of any system including a processor and memory that is capable of performing the functions and/or operations described within this specification. For example, the client device 170 can be implemented as a computer, a workstation, a mobile computer, a laptop computer, tablet computer, a smart phone, a personal digital assistant, a gaming device, an appliance, and so on.

The memory elements 610 can include one or more physical memory devices such as, for example, local memory 620 and one or more bulk storage devices 625. Local memory 620 refers to RAM or other non-persistent memory device(s) generally used during actual execution of the program code. The bulk storage device(s) 625 can be implemented as a HDD, SSD, or other persistent data storage device. The client device 170 also can include one or more cache memories (not shown) that provide temporary storage of at least some program code in order to reduce the number of times program code must be retrieved from the bulk storage device 625 during execution.

Input/output (I/O) devices such as a display 630, a pointing device 635 and, optionally, a keyboard 640 and/or audio devices 645 (e.g., speakers, microphones, etc.) can be coupled to the client device 170. The I/O devices can be coupled to the client device 170 either directly or through intervening I/O controllers. For example, the display 630 can be coupled to the client device 170 via a graphics processing unit (GPU), which may be a component of the processor 605 or a discrete device. One or more network adapters 650 also can be coupled to client device 170 to enable client device 170 to become coupled to other systems, computer systems, remote printers, and/or remote storage devices through intervening private or public networks. Modems, cable modems, transceivers, and Ethernet cards are examples of different types of network adapters 650 that can be used with client device 170.

As pictured in FIG. 6, the memory elements 610 can store the components of the client device 170, namely the user experience components 140. Being implemented in the form of executable program code, these components of the system 100 can be executed by the client device 170 and, as such, can be considered part of the client device 170. Moreover, the user experience components 140 are functional data structures that impart functionality when employed as part of the client device 170 of FIG. 6.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of language enhancement, the method comprising:
    automatically gathering source text from a plurality of text sources, wherein at least a portion of the source text is stored as natural language documents, the plurality of text sources including at least one social media website, and storing the source text to a thesaurus data infrastructure;
    receiving subject text being exposed to thesaurus processing;
    identifying a context of the subject text;
    identifying source text having context similar to the context of the subject text by accessing the thesaurus data infrastructure and processing the source text using dynamically created rules to identify the source text having context similar to the context of the subject text, the dynamically created rules generated by performing initial processing on the source text when the source text is gathered;
    analyzing, using a processor, the identified source text to identify at least one candidate word or phrase contained in the source text to recommend as a replacement for at least one word or phrase contained in the subject text by performing natural language inference processing on the source text stored as natural language documents; and
    recommending the identified at least one candidate word or phrase as the replacement for the at least one word or phrase contained in the subject text by presenting the at least one candidate word or phrase on a display;
    wherein the recommendations follow the thesaurus further querying previously acquired source texts or documents having similar context.

2. The method of claim 1, wherein the at least one candidate word or phrase contained in the source text comprises a plurality of candidate words or phrases, the method further comprising:
    assigning a ranking to each of the of the candidate words or phrases, each ranking assigned to a respective candidate word or phrase indicating a level of confidence that the respective candidate word or phrase is an appropriate replacement for the word or phrase contained in the subject text.

3. The method of claim 2, wherein recommending the identified at least one candidate word or phrase as the replacement for at least one word or phrase contained in the subject text comprises:
    presenting to a user each of the candidate words or phrases and the respective ranking assigned to each of the candidate words or phrases.

4. The method of claim 1, wherein the context of the subject text is identified by scanning at least a portion of a document containing the subject text.

5. The method of claim 1, wherein the context of the subject text is identified by scanning an entire document containing the subject text.

6. The method of claim 1, wherein automatically gathering source text from a plurality of text sources comprises:
    performing automated web crawling of social media websites to identify new source text to be stored in the thesaurus data infrastructure.

7. A system comprising:
    a processor programmed to initiate executable operations comprising:

automatically gathering source text from a plurality of text sources, wherein at least a portion of the source text is stored as natural language documents, the plurality of text sources including at least one social media website, and storing the source text to a thesaurus data infrastructure;

receiving subject text being exposed to thesaurus processing;

identifying a context of the subject text;

identifying source text having context similar to the context of the subject text by accessing the thesaurus data infrastructure and processing the source text using dynamically created rules to identify the source text having context similar to the context of the subject text, the dynamically created rules generated by performing initial processing on the source text when the source text is gathered;

analyzing the identified source text to identify at least one candidate word or phrase contained in the source text to recommend as a replacement for at least one word or phrase contained in the subject text by performing natural language inference processing on the source text stored as natural language documents; and recommending the identified at least one candidate word or phrase as the replacement for the at least one word or phrase contained in the subject text by presenting the at least one candidate word or phrase on a display;

wherein the recommendations follow the thesaurus further querying previously acquired source texts or documents having similar context.

8. The system of claim 7, wherein the at least one candidate word or phrase contained in the source text comprises a plurality of candidate words or phrases, the executable operations further comprising:

assigning a ranking to each of the of the candidate words or phrases, each ranking assigned to a respective candidate word or phrase indicating a level of confidence that the respective candidate word or phrase is an appropriate replacement for the word or phrase contained in the subject text.

9. The system of claim 8, wherein recommending the identified at least one candidate word or phrase as the replacement for at least one word or phrase contained in the subject text comprises:

presenting to a user each of the candidate words or phrases and the respective ranking assigned to each of the candidate words or phrases.

10. The system of claim 7, wherein the context of the subject text is identified by scanning at least a portion of a document containing the subject text.

11. The system of claim 7, wherein the context of the subject text is identified by scanning an entire document containing the subject text.

12. The system of claim 7, wherein automatically gathering source text from a plurality of text sources comprises:

performing automated web crawling of social media websites to identify new source text to be stored in the thesaurus data infrastructure.

13. A computer program product for enhancing language, the computer program product comprising a computer readable storage device having program code stored thereon, wherein the computer readable storage device is not a transitory, propagating signal per se, the program code executable by a processor to perform a method comprising:

automatically gathering, by the processor, source text from a plurality of text sources, wherein at least a portion of the source text is stored as natural language documents, the plurality of text sources including at least one social media website, and storing the source text to a thesaurus data infrastructure;

receiving, by the processor, subject text being exposed to thesaurus processing;

identifying, by the processor, a context of the subject text;

identifying, by the processor, source text having context similar to the context of the subject text by accessing the thesaurus data infrastructure and processing the source text using dynamically created rules to identify the source text having context similar to the context of the subject text, the dynamically created rules generated by performing initial processing on the source text when the source text is gathered;

analyzing, by the processor, the identified source text to identify at least one candidate word or phrase contained in the source text to recommend as a replacement for at least one word or phrase contained in the subject text by performing natural language inference processing on the source text stored as natural language documents; and recommending, by the processor, the identified at least one candidate word or phrase as the replacement for the at least one word or phrase contained in the subject text by presenting the at least one candidate word or phrase on a display;

wherein the recommendations follow the thesaurus further querying previously acquired source texts or documents having similar context.

14. The computer program product of claim 13, wherein the at least one candidate word or phrase contained in the source text comprises a plurality of candidate words or phrases, the method further comprising:

Assigning, using the processor, a ranking to each of the of the candidate words or phrases, each ranking assigned to a respective candidate word or phrase indicating a level of confidence that the respective candidate word or phrase is an appropriate replacement for the word or phrase contained in the subject text.

15. The computer program product of claim 14, wherein recommending the identified at least one candidate word or phrase as the replacement for at least one word or phrase contained in the subject text comprises:

presenting to a user each of the candidate words or phrases and the respective ranking assigned to each of the candidate words or phrases.

\* \* \* \* \*